United States Patent
Ueno

(10) Patent No.: US 6,704,665 B2
(45) Date of Patent: Mar. 9, 2004

(54) TORQUE SENSOR ABNORMALITY DETECTING DEVICE

(75) Inventor: Takayuki Ueno, Tochigi (JP)

(73) Assignee: Showa Corporation (JP)

( * ) Notice: Subject to any disclaimer, the term of this patent is extended or adjusted under 35 U.S.C. 154(b) by 51 days.

(21) Appl. No.: 10/091,728

(22) Filed: Mar. 6, 2002

(65) Prior Publication Data

US 2003/0040872 A1 Feb. 27, 2003

(30) Foreign Application Priority Data

Aug. 21, 2001 (JP) ........................................ 2001-249897

(51) Int. Cl.[7] .............................. G01L 1/00; G01L 3/02; G01L 3/10
(52) U.S. Cl. ..................... 702/41; 73/1.09; 73/862.331; 324/546
(58) Field of Search ................ 702/41, 33; 73/862.331, 73/1.09, 862.333, 862.335, 862.334; 324/546, 225, 233–239, 526

(56) References Cited

U.S. PATENT DOCUMENTS

| | | | |
|---|---|---|---|
| 4,371,265 A | * | 2/1983 | Mitsuhashi .................. 356/432 |
| 5,641,916 A | | 6/1997 | Satoh et al. |
| 5,712,563 A | | 1/1998 | Kawagoe et al. |
| 6,456,090 B1 | * | 9/2002 | Ishikawa et al. ............ 324/546 |

FOREIGN PATENT DOCUMENTS

| | | |
|---|---|---|
| DE | 19901178 | 4/2000 |
| DE | 10047949 | 5/2001 |
| JP | 3131667 | 11/2000 |

* cited by examiner

Primary Examiner—John Barlow
Assistant Examiner—Meagan Walling
(74) Attorney, Agent, or Firm—Orum & Roth

(57) ABSTRACT

In an abnormality detecting device of a torque sensor including a pair of coils in which inductance is changed in opposite directions corresponding to torque and a torque detecting means for outputting a torque detection voltage from both voltages based on a change in inductance of each of the pair of the coils, the abnormality detecting having:

- a pair of filter circuits for extracting the DC component of each voltage based on the pair of the coils and change in each inductance,
- a differential means for outputting a difference in voltage of the DC voltage outputted from each of the filter circuits as the abnormality detection voltage
- a memory means for memorizing a normal tolerance range preliminarily set up about the abnormality detection voltage of the differential means and
- a determining means for determining whether or not the abnormality detecting voltage outputted by the differential means is in the normal tolerance range memorized by the memory means.

2 Claims, 4 Drawing Sheets

TORQUE SENSOR ABNORMALITY DETECTING DEVICE

BACKGROUND OF THE INVENTION

1. Field of the Invention

The present invention relates to a torque sensor abnormality detecting device which detects a torque on the basis of each inductance change of a pair of coils.

2. Description of the Related Art

In a torque sensor, since a coil itself has a temperature characteristic, the voltage based on each inductance of a pair of the coil changes depending on the temperature.

If an abnormality such as disconnection of the coil, disconnection of harness and contact failure is detected from each voltage, temperature compensation of each voltage is necessary because an influence of the temperature reaches each voltage, thereby disabling an accurate detection of the abnormality.

For this reason, a temperature sensor such as a thermister dedicated to detecting the temperature is provided on the torque sensor. Temperature compensation of each voltage is carried out based on a detected temperature to remove influence of the temperature and detect an abnormality such as disconnection.

The thermister needs to be provided on the torque sensor so as to detect the temperature thereof with an excellent sensibility for the temperature and therefore, a substrate or a holding component for holding the thermister is required, with the result that the quantity of required components increases leading to an increase of cost.

SUMMARY OF THE INVENTION

The present invention has been achieved in view of these problems. An object of the present invention is to provide a torque sensor abnormality detecting device capable of detecting an abnormality such as disconnection in the torque sensor or the like without the use of any temperature sensor so as to achieve low cost with fewer components.

According to the present invention, there is disclosed an abnormality detecting device of a torque sensor including a pair of coils in which inductance is changed in opposite directions corresponding to torque and a torque detecting means for outputting a torque detection voltage from both voltages based on a change in inductance of each of the pair of the coils. The abnormality detecting device comprises a pair of filter circuits for extracting DC component of each voltage based on the pair of the coils and change in each inductance, a differential means for outputting a difference in voltage of the DC voltage outputted from each of the filter circuits as the abnormality detection voltage, a memory means for memorizing a normal tolerance range preliminarily set up about the abnormality detection voltage of the differential means, and a determining means for determining whether or not the abnormality detecting voltage outputted by the differential means is in the normal tolerance range memorized by the memory means.

BRIEF DESCRIPTION OF THE DRAWINGS

The present invention will be more fully understood from the detailed description given below and from the accompanying drawings which should not be taken to be a limitation on the invention, but are for explanation and understanding only.

DESCRIPTION OF THE PREFERRED EMBODIMENTS

One embodiment of the present invention will be described below with reference to FIG. 1 to FIG. 4.

Figure 1:
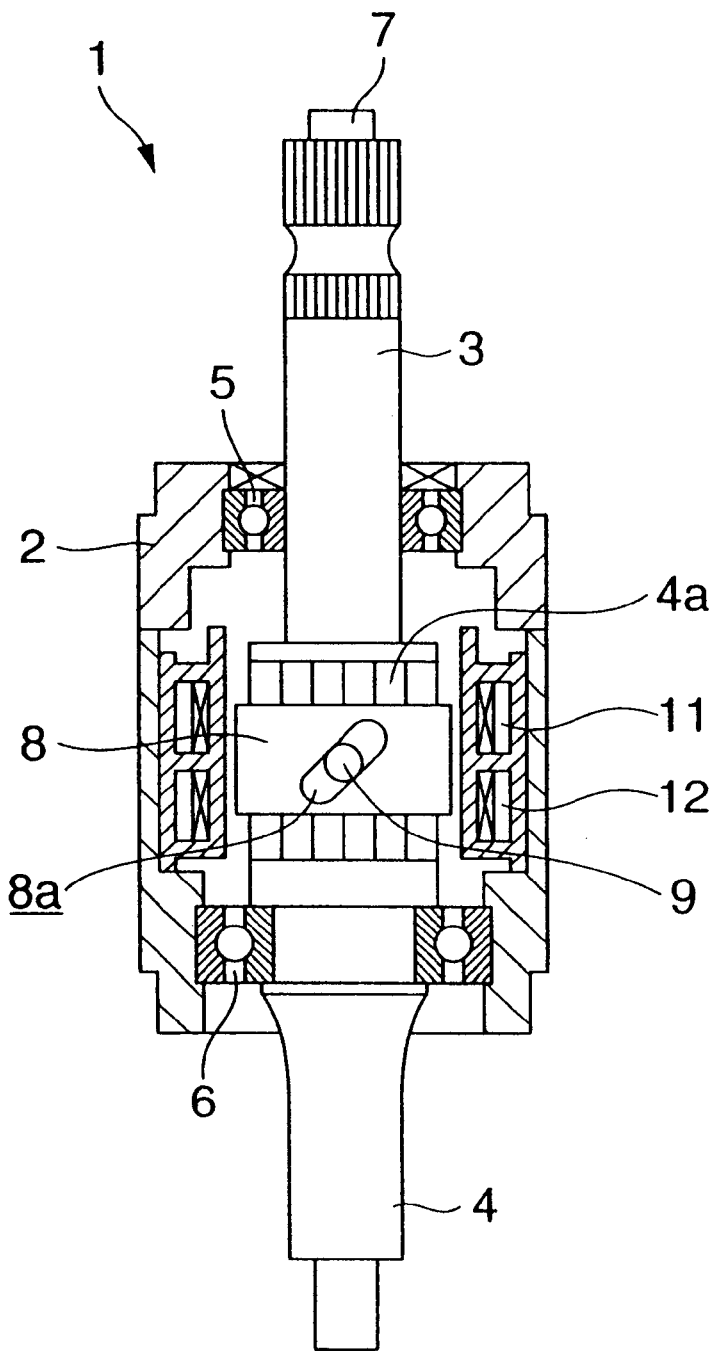
FIG. 1 is a view schematically showing a construction of mechanical parts of a torque sensor according to one embodiment of the present invention.

A torque sensor 1 of this embodiment is applied to a power steering system for a vehicle, and FIG. 1 schematically shows a structure of the torque sensor 1.

An input shaft 3 and an output shaft 4 are rotatably supported via bearings 5 and 6, and coaxially inserted into a housing 2, and are connected by a torsion bar 7 therein.

A cylindrical core 8 is fitted onto a serrated outer peripheral surface of a large-diameter end portion 4a of the output shaft 4, and is provided so as to be slidable in only an axial direction with respect to the output shaft 4. A slider pin 9 projected from the input shaft 3 is fitted into a spiral groove 8a of the core 8 in a circumferential direction of the large-diameter end portion 4a through a long slot.

Two torque detecting coils 11 and 12 supported in the housing 2 are provided at an outer periphery of the cylindrical core 8 slidable along an axial direction via a space.

These two coils 11 and 12 are arranged at a side opposite to each other with respect to the center of the axial direction of the slidable core 8.

When a torsional stress acts on the input shaft 3, a rotating force is transmitted to the output shaft 4 via the torsion bar 7, and then, the torsion bar 7 is elastically deformed. As a result, a relative displacement of a rotating direction is generated between the input shaft 3 and the output shaft 4.

The relative displacement of the rotating direction slides the core 8 to the axial direction by an engagement of the slider pin 9 and the spiral groove 8a.

When the core 8 is moved to the axial direction, each area of the coils 11 and 12 surrounding the core 8 varies, and there is a relation such that when an area of one coil surrounding the core 8 increases, an area of the other coil surrounding the core 8 decreases.

When the area surrounding the core 8 increases, a magnetic loss increases, therefore, an inductance of the coil decreases. Conversely, when the area surrounding the core 8 decreases, a magnetic loss decreases, therefore, an inductance of the coil increases.

Accordingly, in the case where a torque of moving the core 8 to the coil 11 side acts, an inductance L1 of the coil 11 decreases, and an inductance L2 of the coil 12 increases. Conversely, in the case where a torque of moving the core 8 to the coil 12 side acts, an inductance L1 of the coil 11 increases, and an inductance L2 of the coil 12 decreases.

Figure 2:
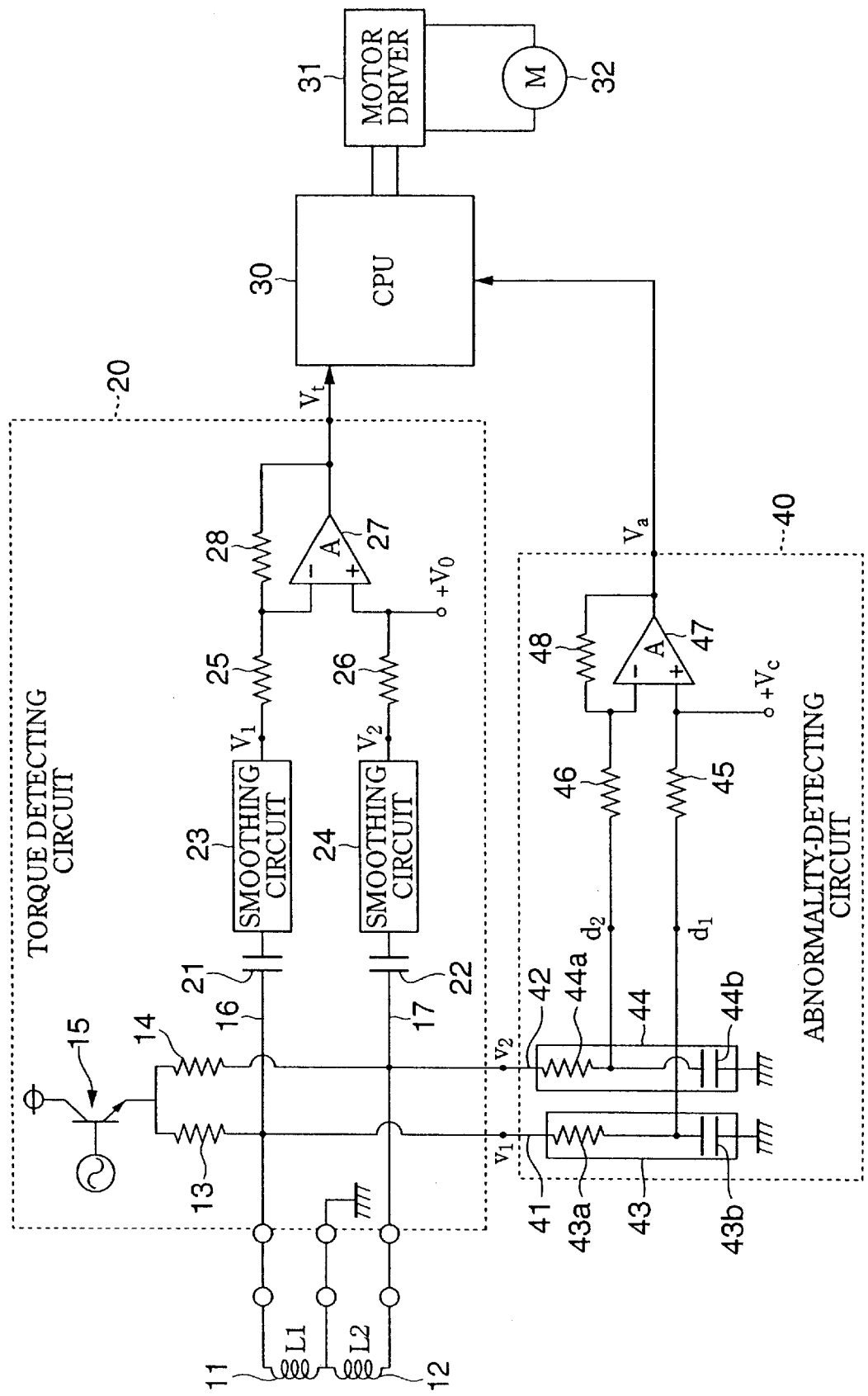
FIG. 2 is a schematic structure diagram of an electric circuit of the same torque sensor.

FIG. 2 shows a schematic structure diagram of an electric circuit for detecting a torque based on changes in inductance L1, L2 of coils 11, 12 in this torque sensor 1.

The coils 11, 12 are connected through each end, and signal lines from that connection terminal and the other ends are extended and connected to connecting terminals of a torque detecting circuit 20 disposed in an electric control unit ECU.

In the torque detecting circuit 20, the connecting terminal between the coils 11 and 12 is grounded while the other ends are connected to an emitter terminal of a transistor 15 through resistors 13, 14.

In the transistor 15, a constant voltage is applied to its collector terminal while AC voltage is inputted to its base terminal.

A voltage signal line 16 extended from a connecting portion between the coil 11 and the resistor 13 is connected to a smoothing circuit 23 through a capacitor 21. A voltage signal line 17 extended from a connecting point between the coil 12 and the resistor 14 is connected to a smoothing circuit 24 through a capacitor 22.

A bridge circuit is comprised of the coils 11, 12 and the resistors 13, 14 and an oscillating AC voltage is inputted to that bridge circuit. Output voltages from that circuit are inputted to the smoothing circuits 23, 24 and smoothed and outputted as first, second voltages $V_1$, $V_2$.

The first, second voltages $V_1$, $V_2$ are inputted to an inversion input terminal and a non-inversion input terminal of a differential amplifier 27, which is an operational amplifier, through the resistors 25, 26.

Negative feedback is applied to the differential amplifier 27 by the resistor 28 so that it functions as a differential amplifier. Its output is inputted to CPU 30 as a torque detection voltage Vt.

Bias voltage $V_0$ is inputted to the non-inversion input terminal of the differential amplifier 27.

Therefore, the differential amplifier 27 amplifies a difference between the first voltage $V_1$ and the second voltage $V_2$ by A times and outputs this plus the bias voltage $V_0$ as torque detection voltage Vt.

That is, the torque detection voltage Vt is $Vt=(V_1-V_2)A+V_0$.

A torque detection voltage Vt at a neutral time which is not deflected to either right steering torque (torsion torque in the right direction) or left steering torque (torsion torque in the left direction) is called neutral point voltage, and the aforementioned bias voltage $V_0$ at the normal time is the neutral point voltage.

This torque sensor 1 has the above-described schematic circuit structure. The operation thereof will be described with reference to FIGS. 3A, 3B showing behaviors of the first, second voltages $V_1$, $V_2$ and the torque detection voltage Vt.

Figure 3A:
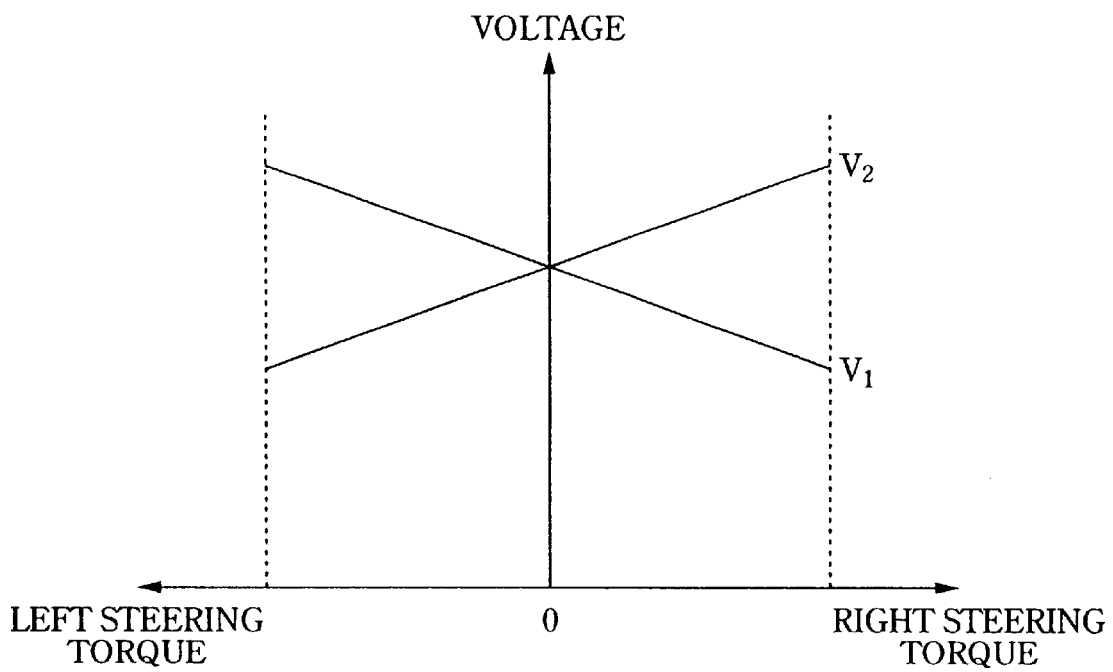
FIGS. 3A and 3B are diagrams showing first and second voltages and torque detecting voltages at normal time.
Figure 3B:
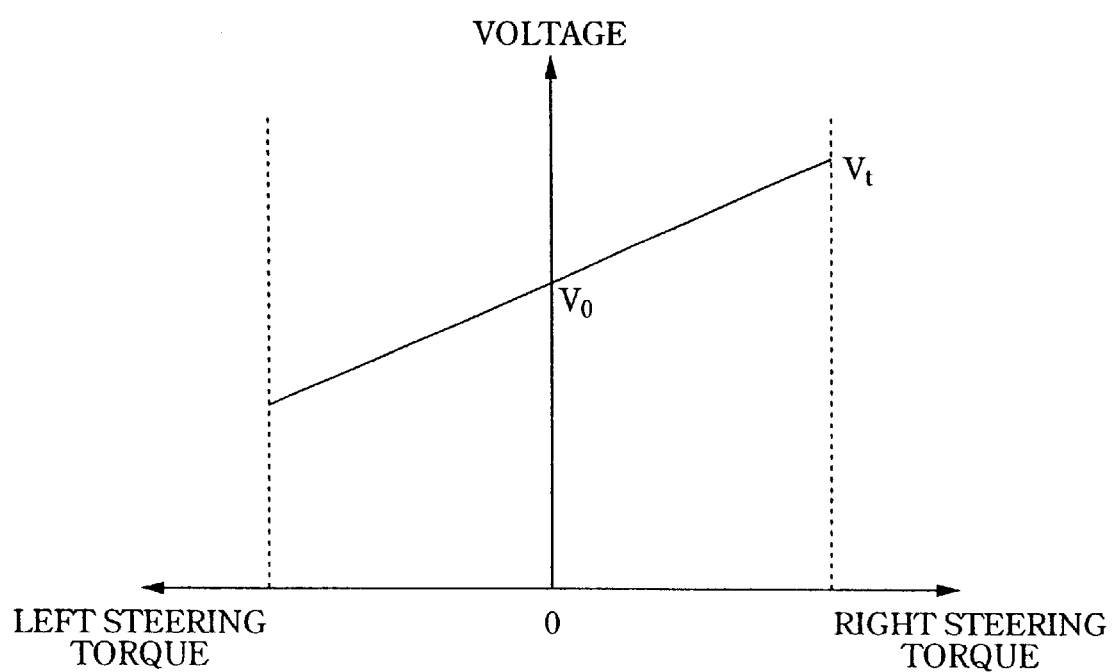

In coordinates shown in FIGS. 3A, 3B, its ordinate axis indicates voltage, rightward in the abscissa axis indicates right steering torque and leftward therein indicates left steering torque, while home position 0 indicates the neutral point.

FIGS. 3A, 3B indicate a condition in which the torque sensor 1 is operated normally. If the right steering torque is increased, a core 8 moves toward the coil 11 due to a relative rotation between the input shaft 3 and the output shaft 4. Consequently, the inductance L2 of the coil 12 is increased so as to increase induced electromotive force and conversely decreases the inductance L1 of the coil 11 so as to decrease induced electromotive force. As a result, the second voltage $V_2$ is increased while the first voltage $V_1$ is decreased (see FIG. 3A).

If left steering torque is increased, conversely, the second voltage $V_2$ is decreased while the first voltage $V_1$ is increased (see FIG. 3A).

The torque detection voltage Vt, which is an output of the differential amplifier 27 gained by multiplying the difference between the both by A times and then adding the bias voltage, is a rightward rising inclined line which passes the bias voltage $V_0$ at the neutral point shown in FIG. 3B.

The right and left steering torque can be detected according to the inclined line of the torque detection voltage Vt shown in FIG. 3B.

The CPU 30 outputs a motor control instruction signal to a motor driver 31 based on the torque detection voltage Vt, so that a motor 32 which assists steering is driven by the motor driver 31.

In this manner, assistance of the motor 32 depending on the steering torque is obtained in the steering operation.

The torque sensor 1 having the above-described power steering control mechanism includes an abnormality detecting circuit 40.

Voltage signal lines 41, 42 branched from the voltage signal lines 16, 17 as shown in FIG. 2 are grounded through filter circuits 43, 44.

In the filter circuits 43, 44, resistors 43a, 44a and capacitors 43b, 44b are connected in series, and each connecting point between the resistor and the capacitor serves for output.

Outputs of the filter circuits 43, 44 are inputted to inversion input terminal and non-inversion input terminal of a differential amplifier 47 which is an operational amplifier, through resistors 45, 46.

Negative feedback is applied to the differential amplifier 47 by a resistor 48, which functions as a differential amplifier. Its output is inputted to the CPU 30 as an abnormality detection voltage Va.

A bias voltage Vc is inputted to the non-inversion input terminal of the differential amplifier 47.

Oscillating AC voltages $v_1$, $v_2$, which are to be inputted to the above-described abnormality detecting circuit 40, are expressed with substantially sine curves indicated by $$v_1 = a_1 \sin \theta_1 + d_1$$

$$v_2 = a_2 \sin \theta_2 + d_2$$

Here, of the resistors 13, 14, 43a, 44a which form each bridge, the resistors 13, 14 and 43a, 44a, which make each pair, provide the same resistance, and therefore, amplitudes $a_1$, $a_2$ and DC components $d_1$, $d_2$ are substantially equal.

Filter circuits 43, 44 extract and output DC components $d_1$, $d_2$ from oscillation AC voltages $v_1$, $v_2$, and these DC components $d_1$, $d_2$ are inputted to the inversion input terminal, non-inversion input terminal of a differential amplifier 47.

Therefore, the abnormality detection voltage Va, which is an output of the differential amplifier 47, is $Va=d_1-d_2+Vc$.

If there are no abnormalities such as disconnection and contact failure in the coil and harness, the DC components $d_1$, $d_2$ are equal to each other and therefore, the abnormality detection voltage Va is bias voltage Vc, which indicates a constant voltage.

If there is left or right steering torque, the oscillation AC voltages $v_1$, $v_2$ change, however the DC components $d_1$, $d_2$, which are outputs of the filter circuits 43, 44, do not change but are equal. Therefore, the abnormality detection voltage Va is a constant voltage Vc not relating to the steering torque.

Figure 4:
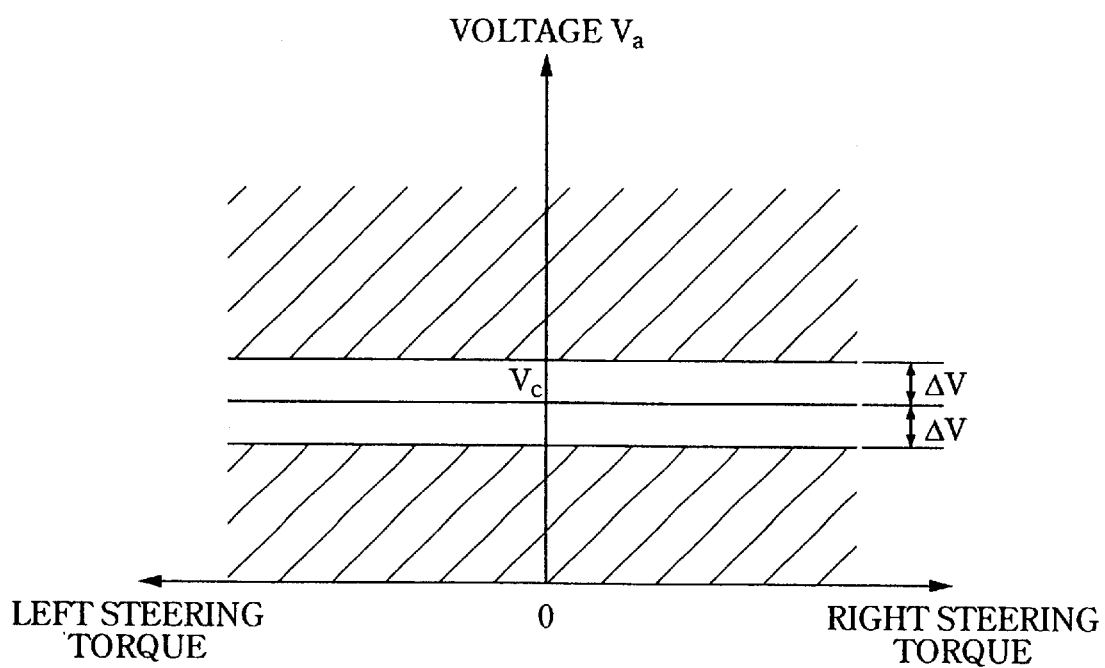
FIG. 4 is a diagram showing the characteristic of an abnormality detection voltage to a steering torque.

FIG. 4 shows the characteristic of this abnormality detection voltage Va with respect to the steering torque.

However, if there is an abnormality such as disconnection of the coils 11, 12 in the torque sensor 1, disconnection or contact failure of the harness, like the voltage signal lines 16, 17, any one of two outputs of the filter circuits 43, 44 is changed, so that the DC components $d_1$, $d_2$ becomes different from each other and a difference $d_1-d_2$ is not zero. Thus, the abnormality detection voltage Va, which is constant as the bias voltage Vc, is changed largely.

In the CPU 30 in which this abnormality detection voltage Va is inputted, a normal allowance range preliminarily set up about the abnormality detection voltage Va is memorized.

The normal allowance range is set up as a range $\pm\Delta V$ of Vc which is an abnormality detection voltage at a normal time as shown in FIG. 4.

The CPU 30 always supervises to determine whether or not the abnormality detection voltage Va outputted from the differential amplifier 47 is in this normal tolerance range.

If there is any abnormality such as disconnection or contact failure in the coil or harness, the abnormality detection voltage Va is changed substantially. Therefore, the normal tolerance range is exceeded large, so that this abnormality can be detected easily with excellent accuracy.

The abnormality-detecting device of the torque sensor 1 of this embodiment is constructed as described above such that no temperature sensor is needed. Thus, the abnormality detecting circuit 40 may be disposed in ECU and does not have to be provided on the torque sensor.

For these reasons, no special board or holding component is necessary, which leads to reduction of the quantity of required components and cost.

Further, because no temperature sensor dedicated for temperature detection such as a thermister is employed, a further reduction of cost can be achieved.

As heretofore explained, embodiments of the present invention have been described in detail with reference to the drawings. However, the specific configurations of the present invention are not limited to the embodiments, but those having a modification of the design within the range of the present invention are also included in the present invention.

According to the present invention, there is provided an abnormality detecting device of a torque sensor including a pair of coils in which inductance is changed in opposite directions corresponding to torque. A torque detecting means is present for outputting a torque detection voltage from both voltages based on a change in inductance of each of the pair of the coils. The abnormality detecting device further comprises a pair of filter circuits for extracting DC component of each voltage based on the pair of the coils and change in each inductance, a differential means for outputting a difference in voltage of the DC voltage outputted from each of the filter circuits as the abnormality detection voltage, a memory means for memorizing a normal tolerance range preliminarily set up about the abnormality detection voltage of the differential means, and a determining means for determining whether or not the abnormality detecting voltage outputted by the differential means is in the normal tolerance range memorized by the memory means.

Therefore, the differential means which outputs the abnormality detection voltage indicates a constant voltage irrespective of the torque if it is normal, because it seeks a difference in voltage of the DC voltage outputted from each filer circuit. If there is any abnormality such as disconnection, or contact failure, this constant voltage changes and exceeds the normal tolerance range. The determining means can detect that abnormality.

Because a difference in voltage of the DC voltage outputted from each filter circuit is sought by the differential means, changes in temperature of the respective coils are offset by each other so that an abnormality detection voltage which is not affected by the temperature of the coil can be obtained. Thus, it is possible to detect an abnormality such as disconnection with high accuracy without provision of any temperature sensor.

Therefore, the temperature sensor does not have to be provided on the torque sensor. No special board or holding component is necessary, thereby leading to reduction of the quantity of required components and cost.

The present invention includes the feature that in the abnormality-detecting device of the torque sensor, the aforementioned differential means is an operational amplifier.

Therefore, the operational amplifier, which is a general product, is employed as a differential means, which outputs the abnormality detection voltage, so that reduction of cost can be achieved.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An abnormality detecting device of a torque sensor including a pair of coils in which inductance is changed in opposite directions corresponding to torque, and a torque detecting means for outputting a torque detection voltage from both voltages based on a change in inductance of each of the pair of the coils, the abnormality detecting device further comprising:

a pair of filter circuits for extracting a DC component of each voltage based on the pair of the coils and change in each inductance;

an operational amplifier for outputting a difference in voltage of the DC voltage outputted from each of the filter circuits as the abnormality detection voltage;

a memory means for memorizing a normal tolerance range preliminarily set up about the abnormality detecting voltage of the operational amplifier; and a determining means for determining whether or not the abnormality detecting voltage outputted by the operational amplifier is the normal tolerance range memorized by the memory means wherein the operational amplifier is a differential amplifier in which any one of the both voltages is inputted to any one of an inversion input terminal and a non-inversion terminal of the differential amplifier and the other one of the both voltages is inputted to the other one, with negative feedback applied to an inversion input terminal and bias voltage applied to a non-inversion input terminal.

2. An abnormality detecting device of a torque sensor as claimed in claim 1, wherein both voltages are obtained by smoothing an output voltage outputted from a bridge circuit comprised of each of the pair of coils and the resistor, into which an oscillation voltage is inputted.

\* \* \* \* \*